US006507556B2

(12) United States Patent
Yamanaka

(10) Patent No.: US 6,507,556 B2
(45) Date of Patent: Jan. 14, 2003

(54) DISC CLAMPING DEVICE

(75) Inventor: Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 87 days.

(21) Appl. No.: 09/778,067

(22) Filed: Feb. 7, 2001

(65) Prior Publication Data

US 2001/0014076 A1 Aug. 16, 2001

(30) Foreign Application Priority Data

Feb. 10, 2000 (JP) ........................................ 2000-038221

(51) Int. Cl.$^7$ ............................................... G11B 23/00
(52) U.S. Cl. ...................................................... 369/270
(58) Field of Search ................................ 369/270, 271; 360/99.05, 99.06, 99.12, 98.08

(56) References Cited

U.S. PATENT DOCUMENTS 5,583,717 A * 12/1996 Nakata et al. ............ 360/99.06

FOREIGN PATENT DOCUMENTS

JP        3-9162        3/1991

* cited by examiner

Primary Examiner—George J. Letscher

(57) ABSTRACT

A disc clamping device seeks to attain size reduction and simplification of the structure without spoiling the smoothness of centering a disc. A disc clamper has an upwardly projecting central hung pin penetrating a circular hole formed in a clamp support member and having a head greater in diameter than the circular hole. At least either one of the portions of the edge of the circular hole and the head of the hung pin in engagement with each other is formed with a tapered surface for centering the disc clamper. The clamp support member is provided with an elastic member, for instance a leaf spring, for pushing the head against the edge of the circular hole.

4 Claims, 3 Drawing Sheets

DISC CLAMPING DEVICE

BACKGROUND OF THE INVENTION

1. Field of the Invention

This invention relates to a disc clamping device, which is adapted to hold a disc clamper in a centered state even when the clamper is spaced apart from a turntable.

2. Description of the Prior Art

As a disc clamping device which is extensively used for a disc player for playing back a disc by rotating the disc in a state clamped between a turntable and a disc clamper, a following one is well known in the art.

The disc clamping device comprises a disc clamper having a boss for penetrating a center hole of a disc. The peripheral edge of the boss has a tapered surface for centering the disc. While the disc clamper is driven by a clamp support member for axial displacement toward a turntable, the tapered centering surface can cause horizontal displacement of the disc and thus center the disc with respect to the disc clamper.

As for the clamp support structure based on the clamp support member, the clamp support member has a circular hole, which is penetrated by a hung pin provided on the side of the disc clamper. The hung pin has a head greater in diameter than the circular hole, and the disc clamper is thus hung for vertical displacement relative to the clamp support member.

In this disc clamping device, when the disc clamper approaches and is brought into engagement with the turntable, the center of rotation of the turntable and the center of rotation of the clamper are brought to be coincident with each other. In order to permit the centering of the disc clamper by the turntable and also prevent the hung pin from touching the edge of the circular hole in the clamp support member when the disc clamper is rotated, a clearance is provided between the edge of the circular hole and the hung pin of the disc clamper by setting the outer diameter of the hung pin to be greater than the inner diameter of the circular hole.

The disc clamper is increased in size as a whole by increasing the stroke of displacement of the disc clamper. For the size reduction of the system, therefore, the displacement stroke of the disc clamper is desirably as small as possible.

As another aspect, by reducing the inclination angle of the tapered surface provided for the centering of the disc on the boss of the disc clamper, the horizontal component of force exerted to the disc when the tapered surface is engaged in the edge of the center hole of the disc is increased to obtain smoother centering of the disc with respect to the disc clamper. By reducing the inclination angle, however, the displacement stroke of the disc clamper that is necessary for horizontal displacement of the disc by a predetermined distance is increased, which is undesired for the size reduction of the system. Conversely, by increasing the inclination angle of the tapered surface for centering the disc, although the displacement stroke of the disc clamping device can be reduced, the horizontal component of force exerted to the disc when the tapered surface is engaged with the edge of the center hole of the disc is also reduced, which is undesired for the smooth centering of the disc with respect to the disc clamper.

As a further aspect, by increasing the clearance between the edge of the circular hole of the clamp support member and the hung pin of the disc clamper, the maximum eccentricity between the disc clamper and the disc is correspondingly increased. In order to permit smooth centering of the disc even with an increased eccentricity of the disc, it is necessary to increase the displacement stroke of the disc clamper or set an increased inclination angle of the tapered surface for centering the disc clamper. As noted above, however, increasing the displacement stroke of the disc clamper makes it difficult to reduce the size of the system, while setting an increased inclination angle of the tapered surface for centering the disc results in spoiling of the smooth centering of the disc. Conversely, reducing the clearance between the edge of the circular hole of the clamp support member and the hung pin of the disc clamper, leads to a problem that doing so makes it difficult to obtain the centering of the disc clamper by the turntable and smooth rotation of the disc clamper.

As a measure for solving the above problems, it is conceivable to let the disc clamper to be secured to the clamp support member by some means when the disc clamper is separated from the turntable.

As an example, Japanese Utility Model Publication No. 3-9162 shows a structure that the disc clamper is secured to the clamp support member by clamping the disc clamper with two levers when the disc clamper is separated from the turntable.

With this measure, the disc clamper is secured to the clamp support member independently of the clearance between the edge of the circular hole of the disc support member and the hung pin of the disc clamper even in the state of the disc clamper separated from the turntable. Thus, the maximum eccentricity between the disc clamper and the disc is not increased due to the clearance between the edge of the circular hole of the clamp support member and the hung pin of the disc clamper. That is, it is not necessary to increase the displacement stroke of the disc clamper with sacrifice of the system size reduction or set an increased inclination angle of the tapered surface for centering of the disc with sacrifice of the smoothness of centering the disc.

However, the structure shown in the Japanese Utility Model Publication No. 3-9162 requires the provision of the two levers for securing the disc clamper to the clamp support member. Besides, it is also necessary to provide a separate releasing mechanism for separating the levers from the disc clamper while the disc clamper approaches the turntable.

SUMMARY OF THE INVENTION

The invention was made for solving the above problems, and it has an object of attaining the size reduction and structure simplification, without spoiling the smoothness of centering the disc with respect to the disc clamper, of the disc clamping device, in which the hung pin provided at the center of the disc clamper and penetrating the circular hole of the clamp support member has the head greater in diameter than the circular hole to let the disc clamper be hung from and supported by the clamp support member, and also in which the clamp support member can cause the disc clamper to approach the turntable for clamping the disc between the turntable and the disc clamper while centering the disc with the tapered centering surface provided on the side of the disc clamper.

In the disc clamping device according to the invention, in which the hung pin provided at the center of the disc clamper and penetrating the circular hole of the clamp support member has the head greater in diameter than the circular hole to let the disc clamper be hung from and supported by the clamp support member, and also in which the clamp support member can cause the disc clamper to approach the turntable for clamping the disc between the turntable and the disc clamper while centering the disc with the tapered centering surface provided on the side of the disc clamper, at least either one of the portions of the edge of the circular hole and the head of the hung pin to be in engagement with each other, is formed as a tapered surface for centering the disc clamper, while the clamp support member is provided with an elastic member for pushing the head against the edge of the circular hole, thus permitting the disc clamper to be centered with respect to the clamp support member by the tapered centering surface in a state of the disc clamper separated from the turntable.

In this structure, since the disc clamper can be held secured to the clamp support member by the tapered centering surface for centering it even when it is in a state separated from the turntable, the maximum eccentricity between it and the disc is not increased due to the clearance between the edge of the circular hole of the clamp support member and the hung pin of the disc clamper. It is thus not necessary to set any particular large displacement stroke of the disc clamper, which is secured for the system size reduction. Also, it is not necessary to particularly increase the inclination angle of the tapered surface for centering the disc, and thus the smoothness of centering the disc is not spoiled. Furthermore, the disc clamper can be held secured to the clamp support member with a simple structure that at least either one of the portions of the head of the hung pin of the disc clamper and the edge of the circular hole of the clamp support member to be in engagement with each other is formed as a tapered surface for centering the disc clamper and that, the clamp support member is provided with an elastic member for pushing the head against the edge of the circular hole.

In a specific structure according to the invention, the tapered surface for centering the disc clamper is provided on the head of the hung pin provided on the center of the disc clamper, and the elastic member is provided on the clamp support member. The hung pin of the disc clamper penetrates the circular hole of the clamp support member, and the tapered surface for centering the disc clamper can be pushed against the edge of the circular hole by pushing the hung pin with the elastic member.

Thus, while the disc clamper is separated from the turntable, it is held by the clamp support member in a state that it is centered with respect thereto with the tapered surface for centering it, which is held pushed against the edge of the circular hole. When the disc clamper is caused by the clamp support member to approach the turntable for clamping the disc between the turntable and it, it is vertically displaced relative to the clamp support member, so that the tapered surface for centering it is separated from the edge of the circular hole.

BRIEF DESCRIPTION OF THE DRAWINGS

These and other objects, features and advantages of the invention will become more apparent upon reading of the following detailed specification and drawings, in which.

DETAILED DESCRIPTION OF THE PREFERRED EMBODIMENTS

Figure 1:
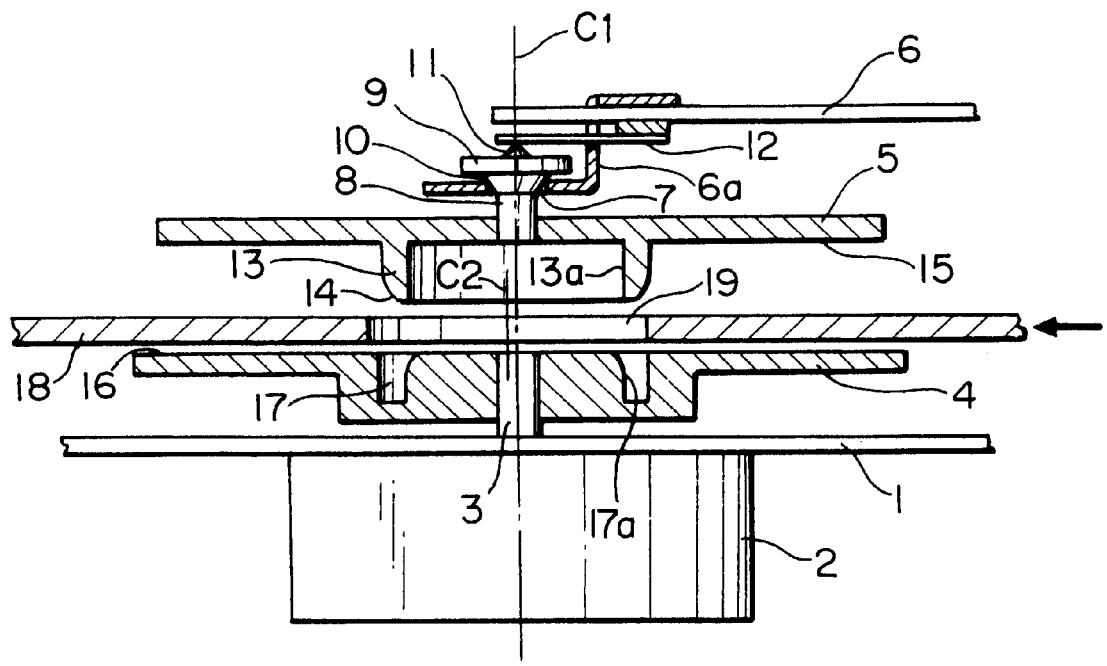
FIG. 1 is a sectional view showing an embodiment of the disc clamping device according to the invention.
Figure 2:
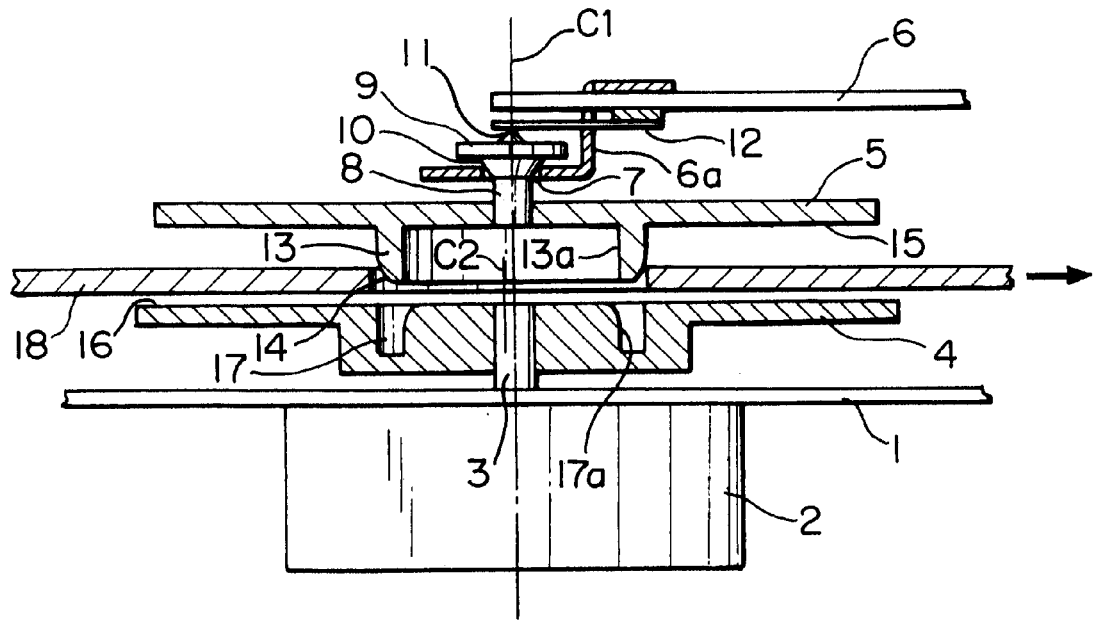
FIG. 2 is a sectional view showing the embodiment of the disc clamping device during a disc clamping operation.
Figure 3:
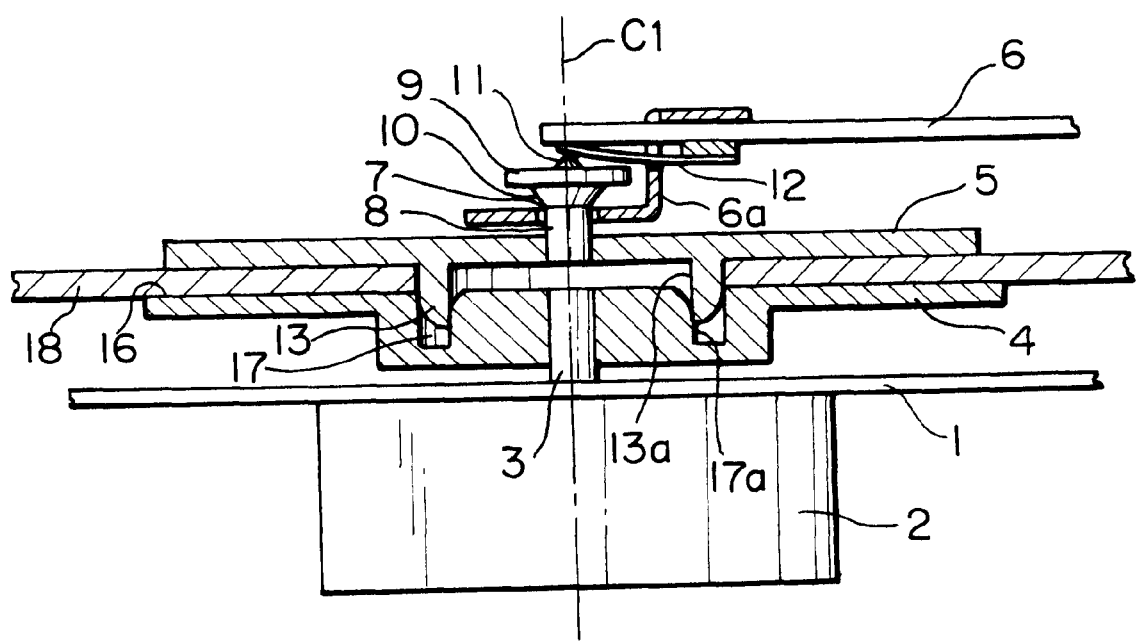
FIG. 3 is a sectional view showing the embodiment of the disc clamping device when the disc clamping operation has been completed.

FIGS. 1 to 3 show an embodiment of the disc clamping device according to the invention. A disc drive motor 2 is mounted on the bottom surface of a disc player chassis plate i such that its shaft 3 projects from the top surf ace of the plate 1. A turntable 4 is secured to the projecting portion of the shaft 3. A clamp support member 6 supports a disc clamper 5, which is disposed above the turntable 4, as follows.

The clamp support member 6 is provided at its free and with a bracket 6a, which is secured to the clamp support member 6 such as to be integral with and constitute part of the claim support member 6. The bracket 6a has a circular hole 7. The disc clamper 5 has a hung pin 8 having a circular sectional profile, which projects from the top surface of the disc clamper 5 and penetrates the circular hole 7. The hung pin 8 has a head 9 having a greater outer diameter than the inner diameter of the circular hole 7, so that it can be hung from the clamp support member 6. The hung pin 8 other than its head 9 has a slightly smaller diameter than the inner diameter of the circular hole 7 to provide an adequate clearance between it and the inner peripheral surface of the circular hole 7.

The clamp support member 6 is driven for vertical displacement by a drive mechanism (not shown) to cause vertical displacement of the disc clamper 5. When clamping the disc 18, the disc clamper 5 is displaced downward toward the turntable from a position spaced apart therefrom (FIG. 1).

The head 9 of the hung pin 8 has a lower downwardly tapered centering portion or surface 10, and also has a sharply pointed small conical projection 11 projecting from the center of its top surface. The clamp support member 6 has a stainless steel leaf spring 12 as elastic member. The leaf spring 12 has a stem end secured to the clamp support member 6 and a free end in elastic engagement with the apex of the small conical projection 11. Via the projection 11 the leaf spring 12 is thus pushing the head 9 downward to push the tapered centering surface 10 against the surface of the circular hole 7. The disc clamper 5 is thus held such that it is secured to the clamp support member 6. Thus, the centerline of the disc clamper 5, i.e., the axis of the hung pin 8, is held such that it is substantially coincident with the centerline C1 of the motor shaft 3 and the turntable 4.

The disc clamper 8 has a substantially cylindrical or annular boss 13 depending from the bottom surface. The outer periphery of the lower end of the boss 13 has a tapered centering surface 14. The outer periphery of the boss 13 other than the tapered end surface 14 is a cylindrical surface having a predetermined diameter. The bottom surface of the disc clamper 5 outside the boss 13 serves as a discretaining surface 15.

By the term "tapered surface" in the specification is meant a surface shape, which is gradually reduced in diameter in the direction of the axis of the hung pin 8, and its cross section including its centerline may be straight or curved in profile. For example, the tapered centering surface 14 for centering the disc 18 in this embodiment is substantially arcuate in its cross section including its centerline. On the other hand, the tapered centering surface 10 for centering the disc clamper 5 is straight in its cross section.

The turntable 4 has a top disc support surface 16, and also has an annular recess 17 for receiving and engaging with the boss 13 of the disc clamper 5 when clamping the disc 18. The disc support surface 16 is formed in an annular area radially outwardly of the annular recess 17.

As shown in FIG. 3, when clamping the disc 18, the inner peripheral surface 13a of the annular boss 13 is lowered and engaged with the outer peripheral surface 17a of an inner boss, which occupies a position inwardly of and defines the annular recess 17. In this way, the disc clamper 5 is centered highly accurately with respect to the turntable 4.

In the disc clamping device having the above construction, when the disc clamper 5 is at its position spaced apart from the turntable 4 as shown in FIG. 1, the tapered surface 10 for centering the disc clamper 5 is held pushed against the surface of the circular hole 7 by the biasing force of the leaf spring 12. In other words, the disc clamper 5 is held such that it is secured to the clamp support member 6, that is, the disc clamper 5 and the clamp support member 6 are held integral with each other, so that when they experience externally exerted vibrations, noise generation from their coupled portions is precluded as much as possible.

When the disc 18 is inserted into the disc player in the stage as shown in FIG. 1, it is transported in the direction as shown by arrow in FIG. 1 until it is brought into contact with a stopper (not shown) and stopped on the disc support surface 16. At this time, the centerline C2 of the disc 18 in the axial direction thereof comes to a position slightly beyond the centerline C1 of the turntable 4 and the disc clamper 5. The distance or eccentricity between the center lines C2 and C1 of the disc 18 and the disc clamper 5, respectively, is set to be in such a range that it is possible to center the disc 18 with the tapered centering surface 14. According to the invention, it is not necessary to take the clearance between the hung pin 8 of the disc clamper 5 and the inner peripheral surface of the circular hole 7 of the clamp support member 6 into considerations as an excess extent of the allowable range of centering the disc 18 with the tapered centering surface 14. This is so because the disc clamper 5 and the clamp support member 6 are centered with respect to each other by the tapered centering surface 10 when clamping the disc 18 and held in this state by the leaf spring 12.

As the disc clamper 5 is continually lowered as shown in FIG. 2 from the spaced-apart position as shown in FIG. 1 toward the turntable 4, its boss 13 penetrates the center hole 19 of the disc 18. As a result, the disc 18 is displaced by the tapered centering surface 14 away from the stopper(not shown) toward its centered position with respect to the disc clamper 5 as shown by arrow in FIG. 2. Ultimately, the cylindrical outer peripheral surface of the boss 13 is perfectly engaged in the center hole 19 of the disc 18, thus completing the centering of the disc 18 with respect to the disc clamper 5.

The disc clamper 5 is further lowered, and its boss 13 enters the annular recess 17 of the turntable 4. As a result, the inner peripheral surface 13a of the boss 13 is engaged with the outer peripheral surface 17a of an inner boss defined by the annular recess 17. Thus, the disc clamper 5 is centered highly accurately with respect to the turntable 4. The centerlines C2 and C1 of the disc clamper 5 and the turntable 4, respectively, thus become coincident with each other.

The disc clamper 5 is further continually lowered until its disc-retaining surface 15 is brought into contact with the top surface of the disc 18. The clamp support member 6 is still further continually lowered, and during this time the leaf spring 12 is flexed as shown in FIG. 3. By the flexing of the leaf spring 12, the centering tapered surface 10 of the disc clamper 5 is allowed to be separated from the edge of the circular hole 7 of the clamp support member 6.

During this time, the disc clamping forces between the disc support surface 16 and the disc retaining surface 15 are maintained owing to the biasing force of the leaf spring 12 offered via the projection 11, the head 9 and the hung pin 8 to the disc clamper 5. Thus, it will be seen that any separate means for obtaining a disc clamping force can be dispensed with by setting a sufficient elastic force of the leaf spring 12 as disc clamping force. In this state, the disc 18 is played back.

During the disc playback, the turntable 4, the disc clamper 5 and the disc 18 are rotated while the projection 11 of the disc clamper 5 is held pushed by the leaf spring 12. However, since the projection 11 is provided at the center of the disc clamper 5 and has a sharply pointed apex, it is possible to greatly alleviate the resistance offered to the rotation of the turntable 4 and so forth and guarantee smooth operation even in the state of engagement between the leaf spring 12 and the projection 11.

While the above embodiment has been described such that the tapered centering surface 10 for centering the disc clamper 5 is formed in the head 9 of the hung pin 8 of the disc clamper 5, it is also possible to form such tapered surface at the inner peripheral edge of the circular hole 7 as tapered surface for centering the disc clamper 5. In this case, the head 9 for engaging with the tapered surface may be formed with a stepped portion, which is slightly greater in diameter than the hung pin 8, for engagement with the tapered surface.

Figure 4:
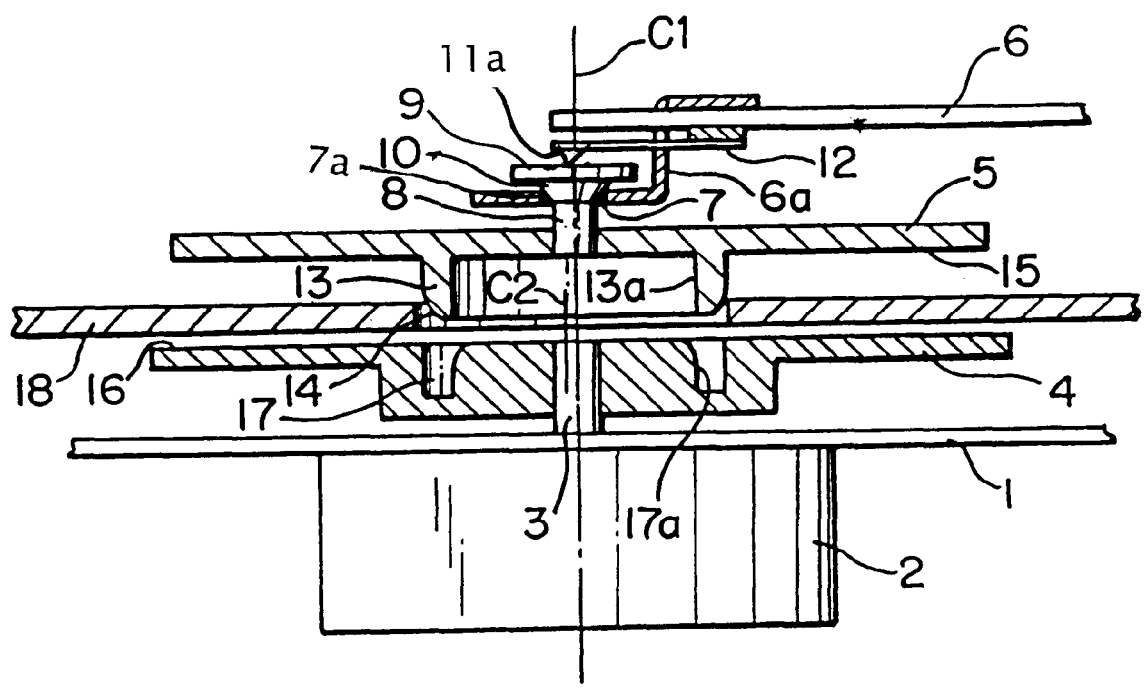
FIG. 4 is a sectional view showing another embodiment of the disc clamping device according to the present invention.

As a further alternative structure, as illustrated in FIG. 4, the portions of the head 9 and the inner peripheral surface of the circular hole 7 to be in engagement with each other, may both be formed as tapered centering surfaces, with FIG. 4 illustrating the tapered centering surface 10 of the head 9 and a tapering centering surface 7a of the circular hole 7. The engagement of these two tapered centering surfaces with each other permits more stable securing of the disc clamper 5 to the clamp support member 6.

Furthermore, as also illustrated in FIG. 4, the projection 11, which is provided on the center of the top surface of the head 9, may alternatively be provided on the side of the leaf spring 12 as a projection 11a. More specifically, a projection may be provided on the free end of the leaf spring 12 for engagement with the top surface of the head 9, which may be made to be flat.

Still further, while in the above embodiment the bracket 6a and the clamp support member 6 are formed as separate members, they actually constitute together the clamp support member 6, and they may be formed together as a one-piece member.

As has been described in connection with its embodiment, the disc clamping device according to the invention is such that the disc clamper 5 is supported by the clamp support member 6 such that the hung pin 8 provided at its center and penetrating the circular hole 7 of the clamp support member 6 has the head 9, which is greater in diameter than the circular hole 7, that the disc clamper 5 is lowered toward the turntable 4 by the clamp support member 6 at the commencement of the operation of clamping the disc 18 for playback thereof, and that the disc 18 is clamped between the turntable 4 and the disc clamper 5 while centering the disc 18 with the tapered centering surface 14 provided on the side of the disc clamper 5.

Particularly, according to the invention at least either one of the portions of the edge of the circular hole 7 and the head 9 of the hung pin 8 to be in engagement with each other, is formed as the tapered centering surface 10 for centering the disc clamper 5, and the clamp support member 6 is provided with an elastic member for pushing the head 9 against the edge of the circular hole 7, whereby the disc clamper 5 is centered by the tapered centering surface 10 while the disc clamper 5 is spaced apart from the turntable 4.

Thus, the disc clamper 5 can be held centered by the tapered centering surface 10 even when it is spaced apart from the turntable 4. Also, since the disc clamper 5 is held centered with respect to the clamp support member 6 by the elastic member, it is possible to preclude any increase of the maximum eccentricity between the disc clamper 5 and the disc 18 due to the clearance between the edge of the circular hole 7 of the clamp support member 6 and the hung pin 8 of the disc clamper 5.

Thus, no particularly large stroke of displacement of the disc clamper 5 need be set, which is desired for the size reduction of the system. Besides, this means that no particularly large inclination angle of the tapered centering surface 14 for centering the disc 18 need be set, and smoother operation of centering the disc 18 is thus obtainable.

Furthermore, the disc clamper 5 can be secured to the clamp support member 6 with a simple structure that, the tapered centering surface 10 for centering the disc clamper 5 is provided on at least either the head 9 of the hung pin 8 or the edge of the circular hole 7 of the clamp support member 6 and, that the clamp support member 6 is provided with the elastic member 12 for pushing the head 9 against the edge of the circular hole 7.

Still further, since the elastic force of the elastic member 12 acts as a disc clamping force, by setting this elastic force as a disc clamping force it is possible to dispense with any separate means for obtaining any disc clamping force and obtain a simpler structure.

Yet further, the elastic member 12 may be made simpler by using a leaf spring such that the free end of the leaf spring is secured to the clamp support member 6 and that the free end of the leaf spring 12 can push the hung pin 8 of the disc clamper 5. In this case, by providing the projection 11 on the top surface of the head 9 of the hung pin 8 or on the free end of the leaf spring 12 for pushing engagement between the head 9 and the leaf spring 12 via the projection 11, it is possible to greatly reduce the resistance offered by the leaf spring to the rotation of the turntable 4 and so forth.

What is claimed is:

1. A disc clamping device comprising a disc clamper having a boss for penetrating a center hole of a disc, the edge of the outer periphery of the boss being formed as a first tapered surface for centering the disc, a hung pin provided in the center of the disc clamper, and a clamp support member having a circular hole penetrated by the hung pin, the hung pin having a head greater in diameter than the circular hole so that the disc clamper is supported by the clamp support member, the clamp support member being capable of causing the disc clamper to approach a turntable for clamping the disc between the turntable and the disc clamper while centering the disc with said first tapered surface, wherein:

at least one of the portions of the edge of the circular hole and the head of the hung pin to be in engagement with each other is formed as a second tapered surface for centering the disc clamper; and an elastic member is attached to the clamp support member for causing the head to be engaged in the edge of the circular hole through said second tapered surface; whereby said disc clamper is centered with respect to the clamp support member by said second tapered surface for centering the disc clamper in a state thereof spaced apart from the turntable.

2. The disc clamping device according to claim 1, wherein the elastic member is a leaf spring having a stem end secured to the clamp support member and a free end for biasing the head of the hung pin in a direction of engagement in the circular hole.

3. The disc clamping device according to claim 2, wherein the head of the hung pin has a sharply pointed small conical projection, whereby via the sharply pointed small conical projection the leaf spring and the head of the hung pin are engaged with each other.

4. The disc clamping device according to claim 2, wherein the free end of the leaf spring has a sharply pointed small conical projection, whereby via the sharply pointed small conical projection the head of the hung pin and the leaf spring are engaged with each other.

* * * * *